US011943490B2

(12) United States Patent
Park et al.

(10) Patent No.: US 11,943,490 B2
(45) Date of Patent: Mar. 26, 2024

(54) APPARATUS AND METHOD FOR MAINTAINING SECURITY OF VIDEO DATA

(71) Applicant: DUDU Information Technologies, Inc., Seoul (KR)

(72) Inventors: Young Sun Park, Seoul (KR); Su Man Nam, Gyeonggi-do (KR); Jin Woo Lee, Seoul (KR); Jun Geol Kim, Gyeonggi-do (KR); Yun Seong Kim, Seoul (KR); Yoon Jeong Kim, Seoul (KR)

(73) Assignee: DUDU Information Technologies, Inc., Seoul (KR)

( * ) Notice: Subject to any disclaimer, the term of this patent is extended or adjusted under 35 U.S.C. 154(b) by 276 days.

(21) Appl. No.: 17/572,644

(22) Filed: Jan. 11, 2022

(65) Prior Publication Data
US 2023/0156251 A1 May 18, 2023

(30) Foreign Application Priority Data
Nov. 18, 2021 (KR) .................. 10-2021-0159491

(51) Int. Cl.
*H04N 21/2347* (2011.01)
*H04L 9/08* (2006.01)
*H04L 9/14* (2006.01)
*H04L 101/622* (2022.01)

(52) U.S. Cl.
CPC ....... *H04N 21/2347* (2013.01); *H04L 9/0822* (2013.01); *H04L 9/0825* (2013.01); *H04L 9/14* (2013.01); *H04L 2101/622* (2022.05)

(58) Field of Classification Search
CPC ......... H04N 21/2347; H04N 21/25816; H04N 7/181; H04N 5/781; H04L 9/0822; H04L 9/0825; H04L 9/14; H04L 9/3263; H04L 2101/622; H04L 63/0435; H04L 63/168
See application file for complete search history.

(56) References Cited

FOREIGN PATENT DOCUMENTS

| KR | 100920171 B1 | 10/2009 |
| KR | 1020210040848 A | 4/2021 |

OTHER PUBLICATIONS

Korean Intellectual Property Office, Office Action for Korean Patent Application No. 10-2021-0159491, dated Feb. 7, 2022, 5 pages.

*Primary Examiner* — Brian F Shaw
(74) *Attorney, Agent, or Firm* — Nicholas Park

(57) ABSTRACT

The method comprises registering at least one of an internet protocol (IP) address and a media access control (MAC) address of the security devices, generating a plurality of public key and private key pairs, encrypting and storing private keys comprised in the plurality of public key and private key pairs using a master key provided from a master key management unit, selecting any one of a plurality of public key and private key pairs when the access of the security device is approved and providing a certificate comprising the selected public key to the security device, receiving a symmetric key encrypted with the public key of the certificate from the security device, and decrypting the private key using the master key provided from the master key management unit.

5 Claims, 4 Drawing Sheets

APPARATUS AND METHOD FOR MAINTAINING SECURITY OF VIDEO DATA

CROSS-REFERENCE TO RELATED APPLICATION

This application claims priority to Korean Patent Application No. 10-2021-0159491, filed on Nov. 18, 2021, and all the benefits accruing therefrom under 35 U.S.C. § 119, the contents of which are incorporated by reference in their entirety.

BACKGROUND

The present disclosure relates to an apparatus and method for maintaining security of video data, and more particularly, to a method for preventing video data from being stolen even in communication through the real-time streaming protocol (RTSP) by encrypting the video data of a photographing device by a security device connected to the photographing device.

A network video recorder (NVR) system is a surveillance device that digitizes all four elements of a camera, a video, a network recorder, and monitoring that make up a surveillance system, and is a system with network processing that controls the entire system based on a keyboard and mouse and high-definition image processing as its. The NVR is different from a digital video recorder (DVR), which cannot be located far away from a camera installation location, in that the NVR can be installed anywhere there is a network because it directly receives and processes a digital image signal from an IP network camera.

Recently, the installation of IP cameras is increasing due to the spread of Internet of Things technology, and the demand for services that remotely manages an IP camera is also increasing. There is a real-time streaming protocol (RTSP) as a protocol widely used for smooth operation of network cameras.

In the RTSP protocol, video data is loaded on the HTTP payload, which is a non-encryption standard, and in this case, an attacker connected to the same network can steal an RTSP packet. In the case of RTSP communication, it is widely known that the mainly used port is port number 554, and an attacker can use this to selectively steal the RTSP packet being transmitted to and received from the IP camera and copy video data without permission.

Therefore, security vulnerability becomes a problem in the process of transmitting and receiving video data within the network, and technologies to compensate for this are required.

SUMMARY

The present disclosure provides an apparatus and method for maintaining security of video data in which, by installing a security device in a network channel between a photographing device (e.g., an IP camera) that captures video and the network video recorder (NVR), the security device can encrypt video data so that the network channel is safely protected.

The present disclosure provides the apparatus and method for maintaining security of video data in which security of video data can be maintained by safely transmitting symmetric key information for the security device to encrypt video data to be safely transmitted to a decryption server.

The present disclosure provides the apparatus and method for maintaining security of video data in which, even if the security of any one of channels formed the security devices and the photographing devices is breached, security stability of a video data network can be strengthened by maintaining the security of other channels.

In accordance with an exemplary embodiment of the present invention, there is provided a method for decrypting video data of a decryption server comprising a communication unit and a processor connected to the communication unit. The communication unit is connected to a video control device and a plurality of security devices for encrypting video data of photographing devices. The method comprises registering at least one of an internet protocol (IP) address and a media access control (MAC) address of the security devices, generating a plurality of public key and private key pairs, encrypting and storing private keys comprised in the plurality of public key and private key pairs using a master key provided from a master key management unit, and deleting original data of the private keys, receiving an access request from the security device, determining whether or not to approve the access of the security device by comparing at least one of the IP address and the MAC address checked in the access request with information registered in advance, selecting any one of a plurality of public key and private key pairs when the access of the security device is approved and providing a certificate comprising the selected public key to the security device, receiving a symmetric key encrypted with the public key of the certificate from the security device, decrypting the private key using the master key provided from the master key management unit and decrypting the encrypted symmetric key using the decrypted private key.

Each of the plurality of public key and private key pairs may be assigned to a different security device, and a certificate comprising a different public key may be provided to each of the security devices.

The method may further comprise forming a proxy channel with the security device and transmitting and receiving a control signal and video data through the proxy channel, in which the video data may be encrypted and decrypted by the symmetric key.

The transmitting and receiving of the control signal and video data through the proxy channel may further comprise generating a first thread for processing a request from the video control device, receiving the control signal from the video control device using the first thread, and transmitting the control signal to the security device using the first thread.

The transmitting and receiving of the control signal and video data through the proxy channel may further comprise generating a second thread for processing the video data obtained from the photographing device, receiving encrypted video data from the security device using the second thread, decrypting the encrypted video data using the second thread with the symmetric key, and transmitting the video data decrypted using the second thread to the video control device.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
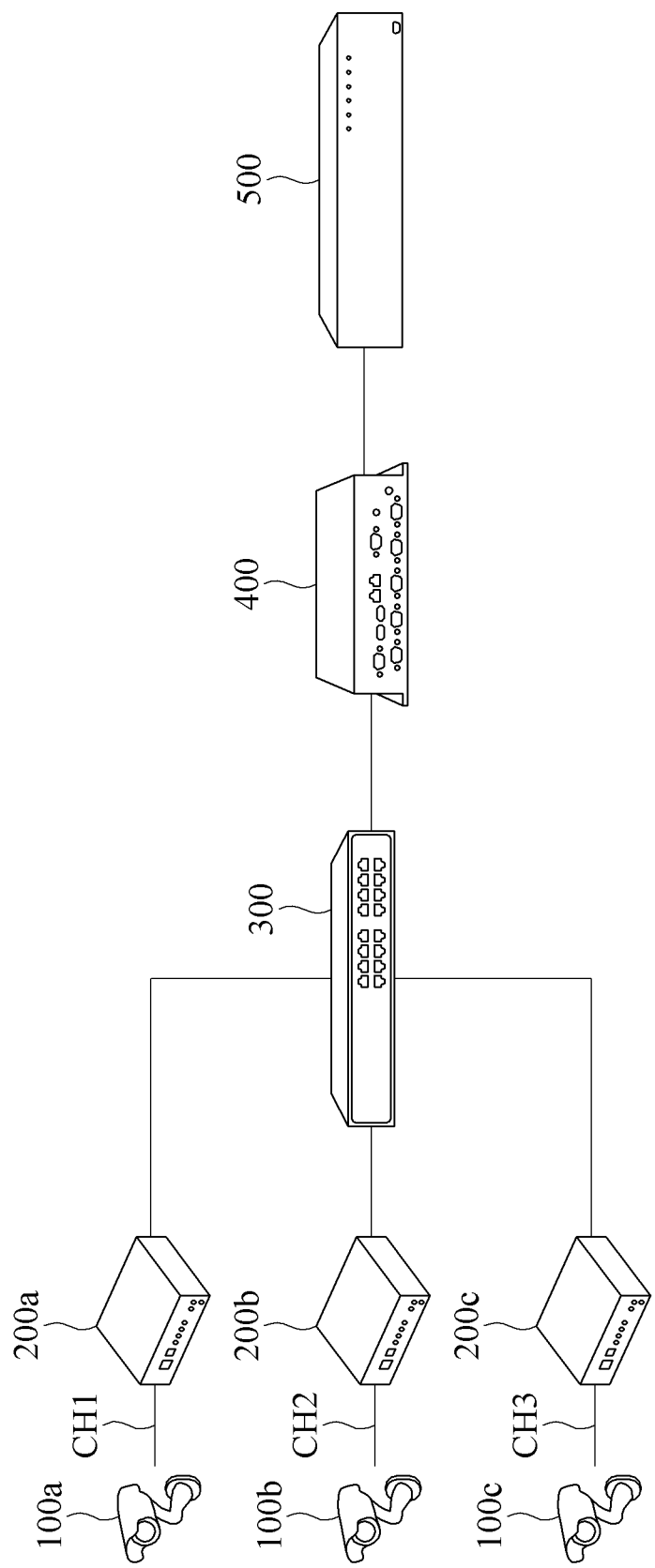
FIG. 1 is a conceptual diagram illustrating a camera network in accordance with exemplary embodiment.

The following detailed description of the present invention refers to the accompanying drawings, which show by way of illustration specific embodiments in which the present invention may be carried out, in order to clarify the objects, technical solutions, and advantages of the present invention. These embodiments are described in detail to enable a person of ordinary skill in the art to carry out the present invention.

Throughout the detailed description and claims of the present invention, the word 'comprise' and its variations are not intended to exclude other technical features, additions, components, or steps. In addition, 'one' or 'an' is used in more than one meaning, and 'another' is limited to at least a second or more.

In addition, terms such as 'first' and 'second' of the present invention are for distinguishing one component from other components, and the scope of rights should not be limited by these terms unless it is understood that the terms indicate an order. For example, a first component may be referred to as a second component, and similarly, the second component may also be referred to as the first component.

When a certain component is referred to as being "connected" to another component, the component may be directly connected to the other component, but it should be understood that another component may be interposed therebetween. On the other hand, when a certain component is referred to as being "directly connected" to another element, it should be understood that another element does not exist in the middle. Meanwhile, other expressions describing the relationship between components, that is, "between" and "immediately between" or "neighboring to" and "directly adjacent to", etc., should be interpreted similarly.

In respective steps, identification symbols (e.g., a, b, c, etc.) are used for convenience of description, and the identification symbols do not describe the order of the respective steps unless it is necessarily logically concluded, and the respective steps may occur differently from the specified order. That is, the respective steps may occur in the same order as specified, may be performed substantially simultaneously, or may be performed in a reverse order.

Other objects, advantages, and characteristics of the present invention will become apparent to a person of ordinary skill in the art in part from this description and in part from carrying-out of the present invention. The following illustrative descriptions and drawings are provided by way of examples and are not intended to limit the present invention. Therefore, the details disclosed herein with respect to a specific structure or function are not to be construed in a limiting sense, but should be construed as representative basic materials that provide guidance for a person of ordinary skill in the art to variously carry out the present invention with virtually any suitable detailed structures.

Furthermore, the present invention encompasses all possible combinations of the embodiments indicated herein. It should be understood that various embodiments of the present invention are different but need not be mutually exclusive. For example, the specific shapes, structures, and characteristics described herein in relation to one embodiment may be implemented in other embodiments without departing from the spirit and scope of the present invention. In addition, it should be understood that the position or arrangement of individual components in each disclosed embodiment may be changed without departing from the spirit and scope of the present invention. Accordingly, the following detailed description is not intended to be taken in a limiting sense, and the scope of the present invention, if properly described, is limited only by the appended claims, along with all scope equivalents to those claimed by the claims. Similar reference numerals in the drawings refer to the same or similar functions throughout the various aspects.

Unless otherwise indicated or clearly contradicted in the context herein, items referred to as singular encompass the plural, unless otherwise required in the context. In addition, in describing the present invention, when it is determined that a detailed description of a related known configuration or function may obscure the gist of the present invention, the detailed description thereof will be omitted.

Hereinafter, in order to enable a person of ordinary skill in the art to easily carry out the present invention, preferred embodiments of the present invention will be described in detail with reference to the accompanying drawings.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the figures, the dimensions of layers and regions are exaggerated for clarity of illustration. Like reference numerals refer to like elements throughout. It will also be understood that when a layer, a film, a region or a plate is referred to as being 'on' another one, it can be directly on the other one, or one or more intervening layers, films, regions or plates may also be present. Further, it will be understood that when a layer, a film, a region or a plate is referred to as being 'under' another one, it can be directly under the other one, and one or more intervening layers, films, regions or plates may also be present. In addition, it will also be understood that when a layer, a film, a region or a plate is referred to as being 'between' two layers, films, regions or plates, it can be the only layer, film, region or plate between the two layers, films, regions or plates, or one or more intervening layers, films, regions or plates may also be present.

FIG. 1 is a conceptual diagram illustrating a camera network according to an exemplary embodiment.

Referring to FIG. 1, the camera network can comprise a plurality of photographing devices 100*a*, 100*b*, and 100*c*. The photographing devices 100*a*, 100*b*, and 100*c* may be devices respectively installed at different locations to photograph a predetermined area. The photographing devices 100*a*, 100*b*, and 100*c* can comprise an internet protocol camera (hereinafter, referred to as an IP camera). The IP camera is a type of digital video camera and can transmit and receive data through a network or the Internet.

The camera network can comprise a plurality of security devices 200*a*, 200*b*, and 200*c*. The security devices 200*a*, 200*b*, and 200*c* can be connected to different photographing devices, respectively. For example, the first security device 200*a* can be connected to the first photographing device 100*a*, and the second security apparatus 200*b* can be connected to the second photographing device 100*b*.

The security devices 200a, 200b, and 200c and the photographing devices 100a, 100b, and 100c can be respectively connected to each other through a local area network (LAN). For example, a first network interface card (LAN NIC) of the first security device 200a can be connected to the first photographing device 100a.

The security devices 200a, 200b, and 200c can be connected to a decryption server 400 through a switch 300. The switch 300 can deliver packets received from the security devices 200a, 200b, and 200c or the decryption server 400 to a designated destination. In some cases, the switch 300 can be omitted. Second LAN NICs of the security devices 200a, 200b, and 200c can be connected to the decryption server 400. When the switch 300 is comprised in the network, the second LAN NICs can be connected to the decryption server 400 through the port of the switch.

The decryption server 400 can exchange data with the security devices 100a, 100b, and 100c. The first LAN NIC of the decryption server 400 can be connected to the security devices 100a, 100b, and 100c through the switch 300. The second LAN NIC of the decryption server 400 can be connected to a video control device 500. The decryption server 400 can form channels with the security devices 200a, 200b, and 200c. Different channels can be respectively formed for the photographing devices 100a, 100b, and 100c. For example, a first channel CH1 can be formed between the first photographing device 100a, the first security device 200a, and the decryption server 400, and a second channel CH2 can be formed between the second photographing device 100b, the second security device 200b, and the decryption server 400.

A symmetric key for encrypting video data may be set differently for each of the channels CH1, CH2, and CH3. In addition, security socket layer (SSL) connection used in the process of exchanging the symmetric key for encrypting video data for each of the channels can be set differently. Therefore, even when the security of one channel is broken by an attacker, the other channels can be protected.

The decryption server 400 can receive a request for video data or a control command for the photographing devices 100a, 100b, and 100c from the video control device 500, and transmit the received request or control command to the photographing devices 100a, 100b, and 100c through the switch 300 and the security devices 200a, 200b, and 200c. The decryption server 400 can receive video data encrypted by the security device 200. The decryption server 400 can decrypt the encrypted video data and transmit the decrypted video data to the video control device 500. Here, the video data may comprise an RTSP packet, a packet according to an open network video interface forum (ONVIF) standard, etc.

Figure 2:
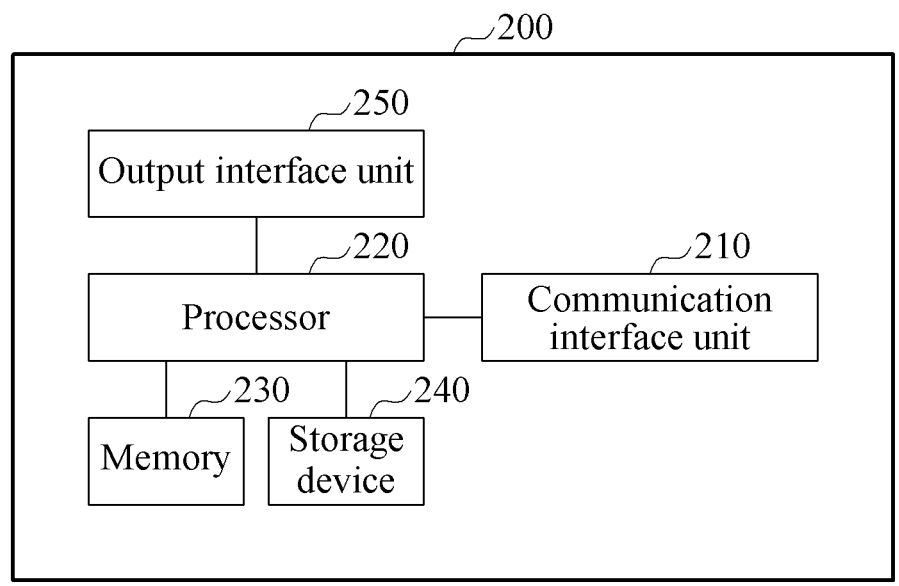
FIG. 2 is a block diagram illustrating a configuration of a security device in accordance with an exemplary embodiment.

FIG. 2 is a block diagram illustrating a configuration of the security device 200 according to an exemplary embodiment.

Referring to FIG. 2, the security device 200 can comprise a communication interface unit 210, a processor 220, and a memory 230, and/or a storage device 240.

The processor 220 may mean a central processing unit (CPU), a graphic processing unit (GPU), or a dedicated processor by which the methods according to embodiments of the present invention are performed. Each of the memory 230 and the storage device 240 can be configured with at least one of a volatile storage medium and a non-volatile storage medium. For example, the memory 130 may be configured with at least one of a read only memory (ROM) and a random access memory (RAM).

Figure 3:
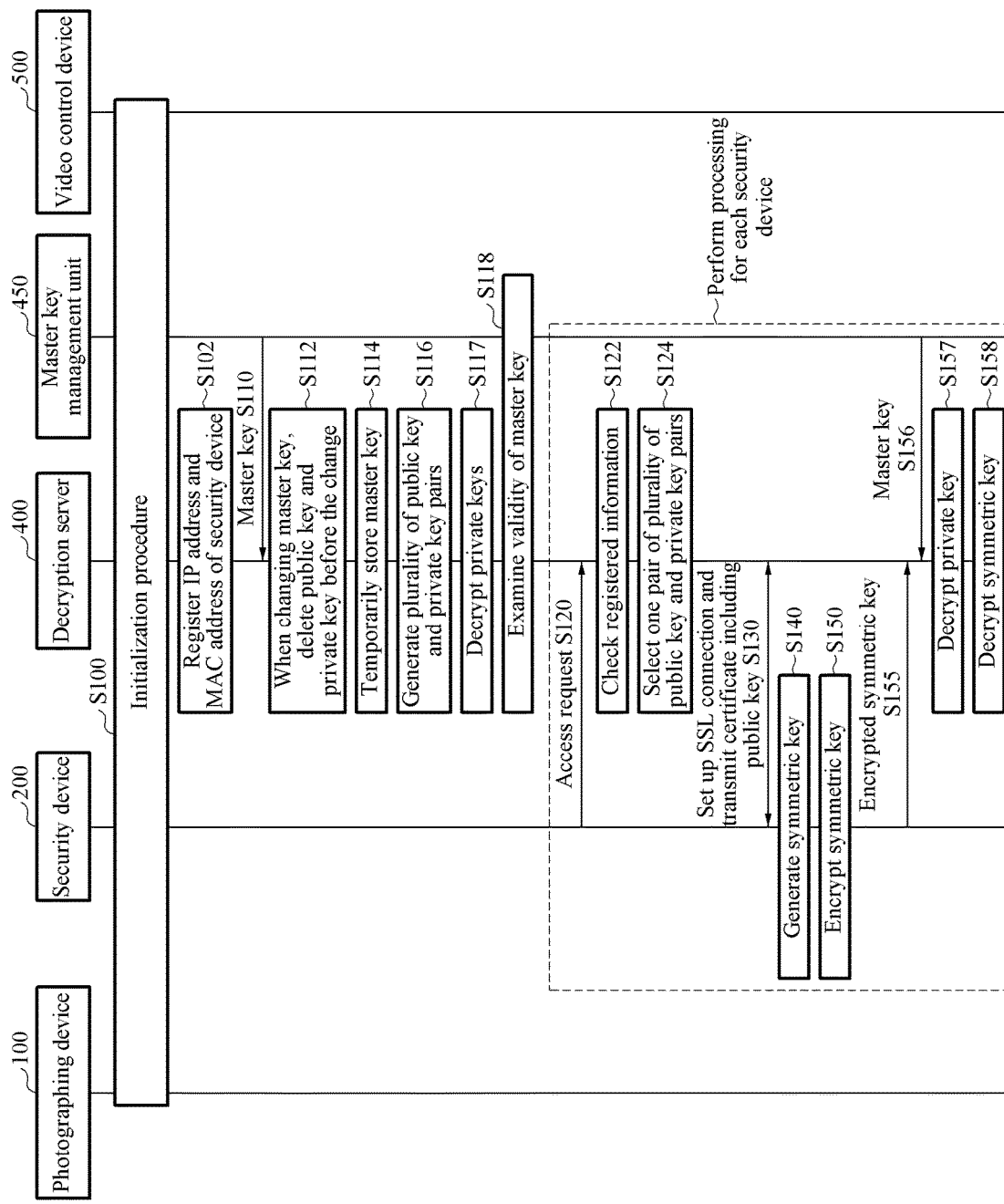
FIG. 3 is a flowchart illustrating a process in which a symmetric key for encrypting and decrypting video data is shared between the security device and a decryption server in accordance with another exemplary embodiment.

FIG. 3 is a flowchart illustrating a process in which the symmetric key for encrypting and decrypting video data is shared between the security device 200 and the decryption server 400 according to an exemplary embodiment. In FIG. 3, the switch 300 of FIG. 1 is omitted from the flowchart for convenience. If the switch 300 is comprised in the camera network, the switch 300 can be provided between the decryption server 400 and the security device 200 to relay communication between the decryption server 400 and the security device 200.

Referring to FIG. 3, an initialization procedure between the photographing device 100, the security device 200, the decryption server 400, and the video control device 500 can be performed, in step S100. In the initialization procedure, setting of a physical connection and a logical connection between the respective devices can be established. In this process, the first LAN NIC of the security device 200 can be connected to the photographing device 100, and the second LAN NIC thereof can be connected to the decryption server 400. The first LAN NIC of the decryption server 400 can be connected to the security device 200, and the second LAN NIC of the decryption server 400 can be connected to the video control device 500. In FIG. 3, one photographing device 100 and one security device 200 are illustrated for convenience, but as illustrated in FIG. 1, there may be a plurality of photographing devices and security devices, and a channel may be formed for each photographing device.

In step S102, the decryption server 400 can register information on the security device 200 that has been subjected to the initialization procedure. The decryption server 400 can register information on at least one of an IP address and a MAC address of the security device 200. As illustrated in FIG. 1, a plurality of photographing devices and a plurality of security devices corresponding thereto may be comprised in the network. The decryption server 400 can register the IP address and MAC address of each of the plurality of security devices 200a, 200b, and 200c. The IP addresses and MAC addresses of the security devices 200a, 200b, and 200c can be corresponded to different channels CH1, CH2, and CH3, respectively.

In step S110, the decryption server 400 can receive a master key from a master key management unit 450. The master key can be used to encrypt and decrypt a private key, which will be described later. The master key management unit 450 may be a hardware security system (HSM) or a key management system, but the embodiment is not limited thereto. The master key management unit 450 can be physically or logically separated from hardware of the decryption server 400.

In step S112, when a new master key is received from the master key management unit 450, the decryption server 400 may destroy both the public key and the private key pairs managed by the master key before the change. If the decryption server 400 receives the master key for the first time, step S112 may be omitted.

In step S114, the decryption server 400 can temporarily store the master key in a memory. For example, the decryption server 400 can store the master key only for a certain period of time without permanently storing the master key. As another example, the decryption server 400 can temporarily store the master key in a volatile memory and delete information on the master key when a predetermined condition is satisfied or time elapses.

In step S116, the decryption server 400 can generate a plurality of public key and private key pairs. In each pair, information encrypted with the public key can be decrypted with the private key. The decryption server 400 can generate several pairs of public key and private key. The decryption server 400 can assign the generated public key and private key pairs to security devices of different channels. For example, the decryption server 400 can assign a first certificate comprising a first public key to a first security device 200a of a first channel CH1 of FIG. 1 and assign a second certificate comprising a second public key to a second security device 200b.

In step S116, the decryption server 400 can encrypt the private keys generated in step S116. FIG. 3 illustratively describe that an encryption operation of the private keys is performed in the decryption server 400. However, the embodiment is not limited thereto. For example, the encryption operation of the private keys may be performed in the master key management unit 450. In this case, the master key management unit 450 can obtain private key information from the decryption server 400 and provide the encrypted private key to the decryption server 400. When the encryption operation of the private keys is completed in step S116, the decryption server 400 can store the encrypted private keys in the memory and delete all original information of the private keys. Accordingly, even if the decryption server 400 is attacked by hacking, the private key information may not be exposed to the outside.

In step S118, the decryption server 400 can periodically or non-periodically examine validity of the master key. The decryption server 400 can transmit information capable of checking the validity of the master key to the master key management unit 450, and can receive authentication of the validity of the master key from the master key management unit 450.

In step S120, the security device 200 can transmit an access request to the decryption server 400. The decryption server 400 can check at least one of the IP address and the MAC address of a device that has transmitted the access request while receiving the access request.

In step S122, the decryption server 400 can compare the IP address and MAC address of the device that has transmitted the access request with information registered in advance. When the IP address and MAC address of the device that has transmitted the access request correspond to the information registered in advance, the decryption server 400 can permit the access of the device. In addition, the decryption server 400 can check to which channel the security device 200 that has made the access request belongs from the IP address and MAC address.

In step S124, the decryption server 400 can randomly select any one of a plurality of public key and private key pairs stored in advance. In this case, all of the private keys may already be encrypted by the master key described above. The decryption server 400 can manage the selected public key and private key pair in correspondence with the security device 200 and the channel to which the security device 200 belongs.

In step S130, the security device 200 can set up the SSL connection with the decryption server 400. The security device 200 can receive public key information from the decryption server 400.

Referring back to FIG. 1 for a moment, since a different key pair is selected for each of the channels CH1, CH2, and CH3 illustrated in FIG. 1, each of the security devices 200a, 200b, and 200c can be assigned a different public key from the decryption server 400.

Referring to FIG. 3 again, in step S140, the security device 200 can generate a symmetric key (or session key). The symmetric key can be used for encryption and decryption of video data, which will be described later.

In step S150, the security device 200 can encrypt the symmetric key using the public key comprised in the certificate received in step S130. The security device 200 can transmit the encrypted symmetric key to the decryption server 400. In step S155, the decryption server 400 can decrypt the encrypted symmetric key.

In step S156, the decryption server 400 can request master key information from the master key management unit 450, and the master key management unit 450 can provide the master key. In step S157, the decryption server 400 can decrypt the private key corresponding to the public key used for encryption of the symmetric key received in step S155. As described above, the private key can be encrypted and stored in the decryption server 400. The decryption server 400 can identify the security device 200 that has transmitted the encrypted symmetric key and decrypt the private key corresponding to the channel to which the security device 200 belongs. The decryption server 400 can decrypt the private key using the master key obtained in step S156. When the decryption of the private key is completed, the decryption server 400 can delete the master key information from its own memory.

FIG. 3 illustratively describes that a decryption operation of the private key is performed by the decryption server 400. However, the embodiment is not limited thereto. For example, the decryption operation of the private key can be performed by the master key management unit 450. The decryption server 400 can provide a private key to be decrypted to the master key management unit 450, and the master key management unit 450 can decrypt the private key and provide the private key to the decryption server 400.

In step S158, the decryption server 400 can decrypt the encrypted symmetric key. Accordingly, the symmetric key can be securely shared between the security device 200 and the decryption server 400. In addition, since the symmetric key is set differently for each channel to which the security device 200 belongs and the procedure for sharing the symmetric key is performed individually, even if the symmetric key of one channel is exposed to the outside, the security of other channels can be maintained. After decrypting the symmetric key, the decryption server 400 can delete the private key information used to decrypt the symmetric key. Only encrypted private key information may be stored in the decryption server 400. Accordingly, even if the decryption server 400 is attacked later, the private key information may not be exposed to the outside. Steps S120 to S158 can be performed for each of the security devices 200a, 200b, and 200c illustrated in FIG. 1. Accordingly, even if the symmetric key of any one of the channels to which the security devices 200a, 200b, and 200c belong is exposed to the outside, the security of other channels can still be maintained.

Figure 4:
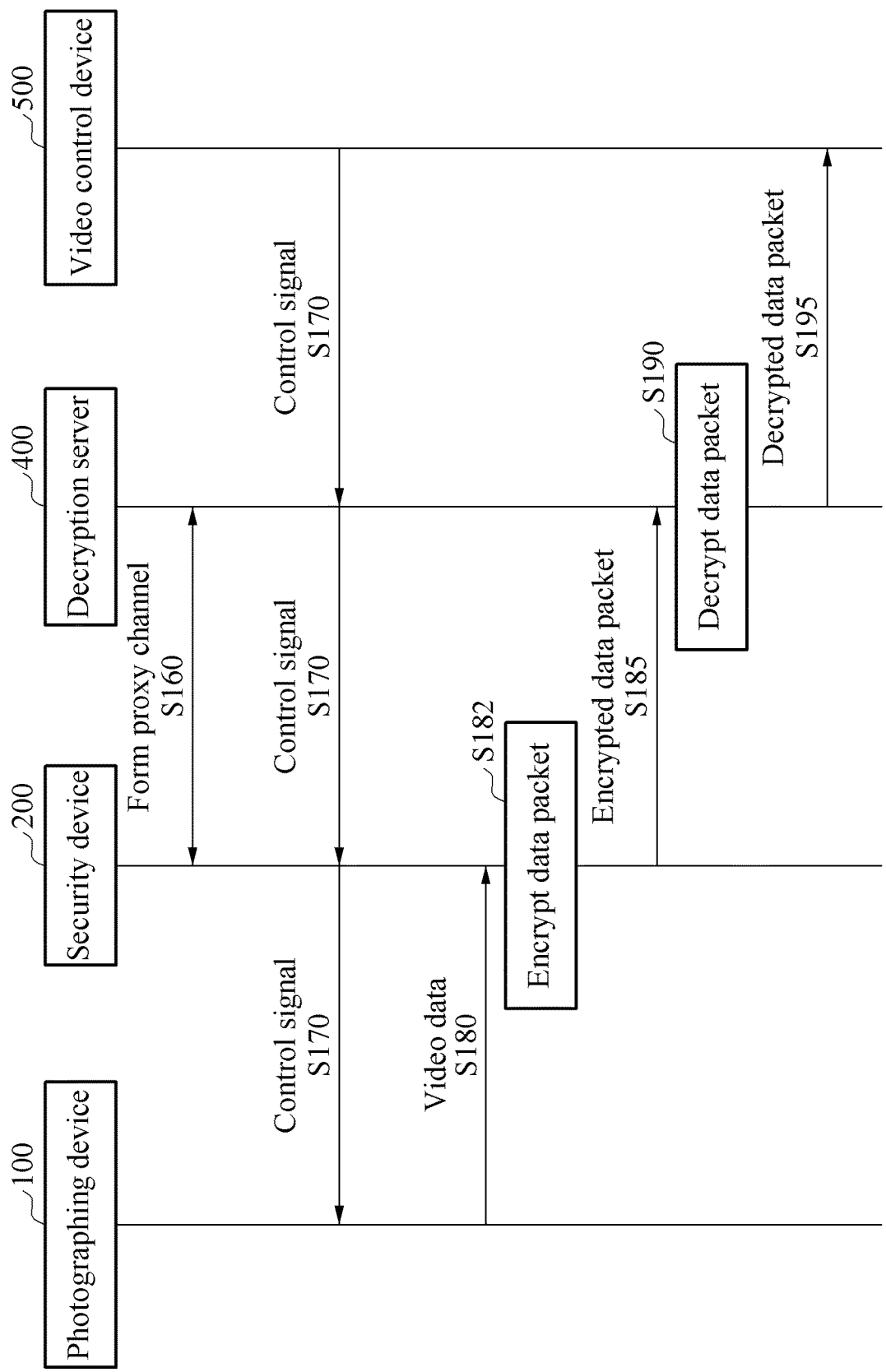
FIG. 4 is a flowchart illustratively describe a procedure for transmitting and receiving a control signal and a data packet between a photographing device and a video control device.

FIG. 4 is a flowchart illustratively describing a procedure for transmitting and receiving a control signal and a data packet between the photographing device 100 and the video control device 500. Referring to FIG. 4, a proxy channel can be formed between the security device 200 and the decryption server 400, in step S160.

In step S170, the video control device 500 can transmit a control signal for the photographing device 100 to the decryption server 400 based on the user's input or its own calculation result. The control signal may comprise a signal for controlling the operation of the photographing device 100, a signal requesting the photographing device 100 to transmit video data, etc. The decryption server 400 can identify a destination address of the control signal and transmit the control signal to the security device 200 corresponding to the identified destination address. In the decryption server 400, the processor can generate a first thread. The processor of the decryption server 400 can transmit a control signal from the video control device 500 to the security device 200 using the first thread.

In step S180, the photographing device 100 can transmit video data to the security device 200.

In step S182, the security device 200 can encrypt the received video data packet with the symmetric key generated in step S140 of FIG. 3.

In step S185, the security device 200 can transmit the encrypted data packet to the decryption server 400.

Since the video data is encrypted and transmitted, even if the encrypted data packet is stolen, the video data may not be exposed to the outside. In step S190, the decryption server 400 can decrypt the data packet to restore the video data. In step S195, the decryption server 400 can deliver the decrypted data to the video control device 500. Through this, the video control device 500 can safely obtain desired video data.

The processor of the decryption server 400 can generate a second thread for receiving video data and decrypting the video data. The processor of the decryption server 400 can perform an operation of decrypting and transmitting the data packet in the direction from the security device 200 to the video control device 500 using the second thread.

The first thread may not perform an encryption function. That is, the packet in the direction from the video control device 500 to the security device 200 may not be encrypted. The processor 220 of the decryption server 400 may separate the first thread and the second thread, and may not assign an encryption function to the first thread. Through this, the time and cost of generating the thread can be saved, and the end time for the first thread can be advanced. In addition, since the first thread and the second thread share a memory and a file, the threads may communicate with each other as needed without intervention of the kernel. The examples described above is merely illustrative and the embodiment is not limited thereto. For example, some of the control signals in the direction from the video control device 500 to the security device 200 may be encrypted like the video data.

The apparatus and method and for maintaining security of video data according to exemplary embodiments have been described above with reference to FIGS. 1 to 4. In at least one embodiment, security performance can be improved in the process of transmitting and receiving video data. According to at least one embodiment, encryption setting information of video data can be safely protected by the SSL protocol. According to at least one embodiment, since the private key for decrypting the symmetric key used for encryption and decryption of video data is encrypted and stored in the decryption server, it is possible to prevent private key information from being exposed to the outside. According to at least one embodiment, it is possible to suppress the occurrence of a delay time between the video control device and the photographing device while improving the security performance of the camera network. According to at least one embodiment, even if the security of any one of the channels formed between the security device and the photographing devices is breached, security stability of the video data network can be strengthened by maintaining the security of other channels.

The embodiments described above can be implemented by a hardware component, a software component, and/or a combination of the hardware component and the software component. For example, the apparatus, method, and components described in the embodiments can be implemented using one or more general purpose or special purpose computers, such as, a processor, a controller, an arithmetic logic unit (ALU), a digital signal processor, a microcomputer, a field programmable gate (FPGA) array, a programmable logic unit (PLU), a microprocessor, or any other device capable of executing and responding to instructions. A processing device can execute an operating system (OS) and one or more software applications running on the operating system. In addition, the processing device can also access, store, manipulate, process, and generate data in response to execution of software. For convenience of understanding, although one processing device may be described as being used, a person of ordinary skill in the art will recognize that the processing device may comprise a plurality of processing elements and/or a plurality of types of processing elements. For example, the processing device can comprise a plurality of processors or one processor and one controller. In addition, the processing device can also have other processing configurations, such as a parallel processor.

Software can comprise a computer program, codes, instructions, or a combination of one or more of these, and can configure the processing device to operate as desired or can, independently or collectively, instruct the processing device to operate as desired. Software and/or data can be permanently or temporarily embodied on any kind of machine, component, physical device, virtual equipment, computer storage medium or device, or signal waves being propagated to be interpreted by the processing device or to provide instructions or data to the processing device. Software can be distributed over networked computer systems and stored or executed in a distributed manner. Software and data can be stored in one or more computer-readable recording media.

The method according to the embodiment can be recorded in a computer-readable medium by being implemented in the form of program instructions that can be executed through various computer means. The computer-readable medium can comprise program instructions, data files, data structures, etc. alone or in combination. The program instructions recorded on the computer-readable medium can be specially designed and configured for the embodiment, or may be known to and available to a person of ordinary skill in computer software. Examples of the computer-readable recording medium comprise a magnetic medium such as a hard disk, floppy disk, and magnetic tape, an optical medium such as a CD-ROM and DVD, and a magneto-optical medium such as a floppy disk, and a hardware device specially configured to store and execute program instructions, such as a ROM, RAM, flash memory, etc. Examples of the program instructions comprise not only machine language codes such as those generated by a compiler, but also high-level language codes that can be executed by a computer using an interpreter or the like. The hardware device described above may be configured to operate as one or more software modules to perform the operations of the embodiments, and vice versa.

Although the embodiments have been described with reference to the limited drawings as described above, a person of ordinary skill in the art may apply various technical modifications and variations thereto based on the matters described above. Even if the described techniques are performed in an order different from the described method, and/or the components of the described system, structure, apparatus, circuit, etc. are coupled or combined in a form other than the described method or replaced or substituted by other components or equivalents, appropriate results can be achieved.

In at least one embodiment, security performance can be improved in the process of transmitting and receiving video data. According to at least one embodiment, encryption setting information of video data can be safely protected by the SSL protocol. According to at least one embodiment, since the private key for decrypting the symmetric key used for encryption and decryption of video data is encrypted and stored in the decryption server, it is possible to prevent private key information from being exposed to the outside. According to at least one embodiment, it is possible to suppress the occurrence of a delay time between the video control device and the photographing device while improving the security performance of the camera network. According to at least one embodiment, even if the security of any one of channels formed between the security devices and the photographing devices is breached, security stability of the video data network can be strengthened by maintaining the security of other channels.

Although the apparatus and method for maintaining security of video data have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A method for decrypting video data of a decryption server that comprises a communication unit and a processor connected to the communication unit, the communication unit being connected to a video control device and a plurality of security devices for encrypting video data of photographing devices, the method comprising:
registering at least one of an internet protocol (IP) address and a media access control (MAC) address of the security devices;
generating a plurality of public key and private key pairs;
encrypting and storing private keys comprised in the plurality of public key and private key pairs using a master key provided from a master key management unit, and deleting original data of the private keys;
receiving an access request from the security device;
determining whether or not to approve the access of the security device by comparing at least one of the IP address and the MAC address checked in the access request with information registered in advance;
selecting any one of a plurality of public key and private key pairs when the access of the security device is approved and providing a certificate comprising the selected public key to the security device;
receiving a symmetric key encrypted with the public key of the certificate from the security device;
decrypting the private key using the master key provided from the master key management unit; and
decrypting the encrypted symmetric key using the decrypted private key.

2. The method of claim 1, wherein
each of the plurality of public key and private key pairs is assigned to a different security device, and a certificate comprising a different public key is provided to each of the security devices.

3. The method of claim 1, further comprising:
forming a proxy channel with the security device; and
transmitting and receiving a control signal and video data through the proxy channel,
wherein the video data is encrypted and decrypted by the symmetric key.

4. The method of claim 3, wherein
the transmitting and receiving of the control signal and video data through the proxy channel further comprises
generating a first thread for processing a request from the video control device,
receiving the control signal from the video control device using the first thread, and
transmitting the control signal to the security device using the first thread.

5. The method of claim 4, wherein
the transmitting and receiving of the control signal and video data through the proxy channel further comprises
generating a second thread for processing the video data obtained from the photographing device,
receiving encrypted video data from the security device using the second thread,
decrypting the encrypted video data using the second thread with the symmetric key, and
transmitting the video data decrypted using the second thread to the video control device.

* * * * *